United States Patent
Park et al.

(10) Patent No.: US 10,521,152 B2
(45) Date of Patent: Dec. 31, 2019

(54) STORAGE DEVICE STORING DATA IN RAID MANNER

(71) Applicants: Dongjin Park, Hwaseong-si (KR); Kilhwan Kim, Yongin-si (KR); Seonghoon Woo, Hwaseong-si (KR)

(72) Inventors: Dongjin Park, Hwaseong-si (KR); Kilhwan Kim, Yongin-si (KR); Seonghoon Woo, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 106 days.

(21) Appl. No.: 15/711,129

(22) Filed: Sep. 21, 2017

(65) Prior Publication Data

US 2018/0129451 A1    May 10, 2018

(51) Int. Cl.
*G06F 12/00* (2006.01)
*G06F 3/06* (2006.01)
*G06F 11/10* (2006.01)

(52) U.S. Cl.
CPC ............ *G06F 3/0658* (2013.01); *G06F 3/061* (2013.01); *G06F 3/0619* (2013.01); *G06F 3/0688* (2013.01); *G06F 11/10* (2013.01); *G06F 11/108* (2013.01); *G06F 12/00* (2013.01); *G06F 2212/262* (2013.01)

(58) Field of Classification Search
CPC ...................................... G06F 12/00
USPC ......................................... 711/114
See application file for complete search history.

(56) References Cited

U.S. PATENT DOCUMENTS

| | | | |
|---|---|---|---|
| 5,157,670 A | 10/1992 | Kowal | |
| 5,787,460 A * | 7/1998 | Yashiro | ............... G06F 11/1076 711/113 |
| 5,958,078 A * | 9/1999 | Yamamoto | .......... G06F 11/1076 714/766 |
| 6,912,687 B1 | 6/2005 | Gates et al. | |
| 7,487,394 B2 | 2/2009 | Forhan et al. | |
| 7,679,133 B2 | 3/2010 | Son et al. | |
| 8,196,018 B2 | 6/2012 | Forhan et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,756,371 B2 | 6/2014 | Hall et al. | |
| 9,208,019 B2 | 12/2015 | Mirichigni | |
| 9,223,514 B2 | 12/2015 | Hyun et al. | |
| 9,244,625 B2 | 1/2016 | Klemm et al. | |

(Continued)

*Primary Examiner* — Gautam Sain
(74) *Attorney, Agent, or Firm* — Harness, Dickey & Pierce, P.L.C.

(57) ABSTRACT

A storage device includes a plurality of nonvolatile memories and a controller. The plurality of nonvolatile memories are configured to distributively store first and second stripes of a stripe set. The controller includes a first memory and a second memory within the controller. The controller is configured to receive the first and second stripes from a host, distributively store the first and second stripes in the plurality of nonvolatile memories, and to perform a parity operation based on the first and second stripes. The controller is configured to generate intermediate parity based on the first stripe and store the intermediate parity in the first memory. If the parity operation is stopped, the controller is configured to move the intermediate parity stored in the first memory to the second memory.

20 Claims, 16 Drawing Sheets

(56) References Cited

U.S. PATENT DOCUMENTS

| | | | |
|---|---|---|---|
| 2001/0008008 A1* | 7/2001 | Mori | G06F 11/2089 |
| | | | 711/114 |
| 2011/0233648 A1 | 9/2011 | Seol et al. | |
| 2012/0167100 A1 | 6/2012 | Li et al. | |
| 2014/0025887 A1* | 1/2014 | Kim | G06F 3/0689 |
| | | | 711/114 |
| 2015/0339194 A1 | 11/2015 | Kalos et al. | |
| 2015/0370713 A1* | 12/2015 | Morishita | G06F 13/10 |
| | | | 711/119 |
| 2016/0188410 A1* | 6/2016 | Lee | G06F 11/1044 |
| | | | 714/6.24 |
| 2016/0217040 A1 | 7/2016 | Jin et al. | |

* cited by examiner

STORAGE DEVICE STORING DATA IN RAID MANNER

CROSS-REFERENCE TO RELATED APPLICATIONS

The patent application claims priority under 35 U.S.C. § 119 to Korean Patent Application No. 10-2016-0147673, filed on Nov. 7, 2016, the entire contents of which are hereby incorporated by reference.

BACKGROUND

The present disclosure relates to semiconductor memory devices, and more particularly, relates to a storage device that stores data in a RAID manner.

A flash memory device is being widely used as voice and image data storage medium of an information device such as a computer, a smart phone, a digital camera, a camcorder, a voice recorder, a MP3 player, a handheld PC, and the like. However, a characteristic of flash memory is an erase operation is performed in advance to write data in a flash memory, and a unit of data being written is smaller than a unit of data being deleted. That characteristic becomes a factor that hinders use of a file system for a general hard disk as it is even in the case when a flash memory is used as an auxiliary memory device. In addition, that characteristic implies that a sequential input/output process of a memory is more efficient than a non-sequential input/output process.

A typical example of a flash memory-based high capacity storage device includes a SSD (solid state drive). As the demand for SSD increases, the uses of SSD are getting more variously divided. For example, the use of SSD may be subdivided into a SSD for server, a SSD for client, and a SSD for stripe set center. An interface of SSD should be able to provide an optimum speed and optimum reliability according to each use. A SATA, a PCIe, a SAS, etc. are applied as the optimum SSD interface to satisfy this requirement.

A storage system including a plurality of storage devices is used to secure high reliability. For example, a RAID (redundant array of independent disk) storage system divides data corresponding to one stripe set and distributively stores the divided stripes in the plurality of storage devices. Since it is unlikely that the plurality of storage devices causes a problem at the same time, this storage system can provide high reliability of data.

SUMMARY

Some example embodiments relate to a storage device. The storage device may include a plurality of nonvolatile memories and a controller. The plurality of nonvolatile memories may be configured to distributively store first and second stripes of a stripe set. The controller may include a first memory and a second memory. The controller may be configured to receive the first and second stripes from a host. The controller may be configured to distributively store the first and second stripes in the plurality of nonvolatile memories. The controller may be configured to perform a parity operation based on the first and second stripes. The controller may be configured to generate intermediate parity based on the first stripe, store the intermediate parity in the first memory and move the intermediate parity stored in the first memory to the second memory if the parity operation is stopped.

Some example embodiments relate to a storage device including a plurality of nonvolatile memories and a controller. The plurality of nonvolatile memories are configured to distributively store first and second stripes of a first stripe set and a third stripe of a second stripe set. The controller is configured to receive the first and second stripes and the third stripe from a host and to distributively store the first and second stripes and the third stripe in the nonvolatile memories. The controller includes a first memory and a second memory. The controller is configured to generate first intermediate parity based on the first stripe, and store the first intermediate parity in the first memory. If the controller receives the third stripe from the host after the first stripe instead of after the second stripe, the controller is configured to move the first intermediate parity stored in the first memory to the second memory, to generate second intermediate parity based on the third stripe, and to store the second intermediate parity in the first memory.

In some example embodiments, a storage device may include a plurality of nonvolatile memories configured to distributively store a plurality of stripes of at least one stripe set and a controller connected to the plurality of nonvolatile memories. The at least one stripe set includes a first stripe set. The controller is configured to receive the plurality of stripes of the at least one stripe set from a host. The controller includes a first memory and a second memory. The controller is configured to perform a parity operation on the plurality of stripes of the at least one stripe set. The parity operation includes using the first memory to buffer an intermediate parity result while the controller generates a final parity of the first stripe set based on the plurality of stripes of the first stripe set and distributes the plurality of stripes of the first strip set to the plurality of memories. The controller is configured to stop the parity operation and to transfer the intermediate parity result to the second memory if an error occurs in a flow of the plurality of stripes of the first stripe set from the host to the controller during the parity operation. The controller is configured to resume the parity operation, if the error in the plurality of stripes of the first stripe set is solved, by transferring the intermediate parity result to the first memory and performing the parity operation to generate the final parity of the first stripe set based on a remaining portion of the plurality of stripes of the first stripe set and the intermediate parity.

BRIEF DESCRIPTION OF THE FIGURES

Inventive concepts will become more apparent in view of the attached drawings and accompanying detailed description.

DETAILED DESCRIPTION

Example embodiments of inventive concepts will be described hereinafter in detail with reference to the accompanying drawings.

Figure 1:
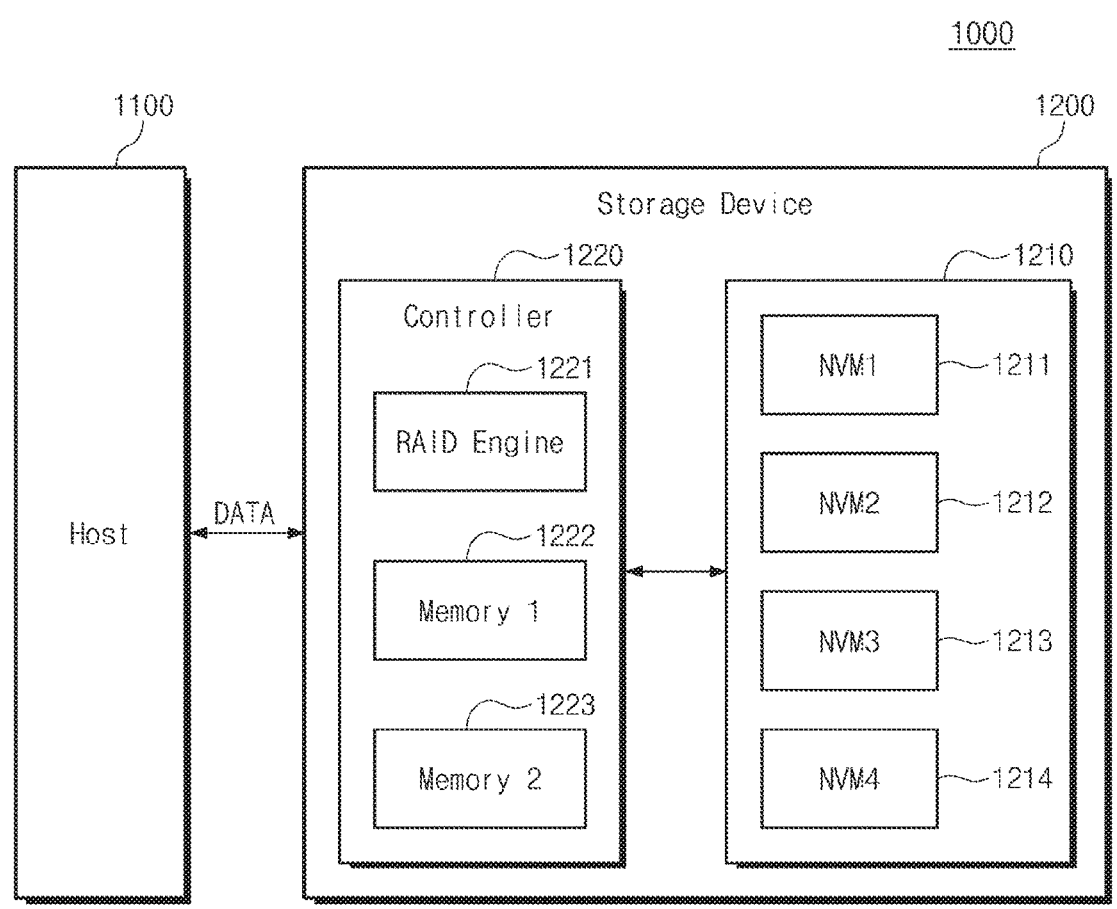
FIG. 1 is a block diagram illustrating an electronic system according to some example embodiments.

FIG. 1 is a block diagram illustrating an electronic system according to some example embodiments. An electronic system 1000 may include a host 1100 and a storage device 1200.

The host 1100 may exchange data with the storage device 1200. The host 1100 may transmit a command to the storage device 1200 to read data DATA from the storage device 1200. The storage device 1200 may provide the requested data DATA to the host 1100 in response to the command. For example, the storage device 1200 may read a stripe set requested from a plurality of nonvolatile memories 1210, and provide the stripe set to the host 1100.

The host 1100 may be implemented to include at least one processor core. For example, the host 1100 may include a general-purpose processor, a dedicated processor, or an application processor. The host 1100 may be a processor itself, or an electronic device or an electronic system including a processor(s).

The storage device 1200 may include the plurality of nonvolatile memories 1210 and a controller 1220. Each of nonvolatile memories 1211, 1212, 1213, and 1214 included in the nonvolatile memories 1210 may store write data or output read data requested by the host 1100. To this end, each of nonvolatile memories 1211, 1212, 1213, and 1214 may include memory area(s) to store data. FIG. 1 shows the four nonvolatile memories 1211, 1212, 1213, and 1214 but inventive concepts are not limited thereto. The number of the nonvolatile memories may be variously changed or modified.

In some example embodiments, each of the nonvolatile memories 1211, 121, 1213, and 1214 may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array. The 3D memory array may include vertical NAND strings that are vertically oriented such that at least one memory cell is located over another memory cell. The at least one memory cell may comprise a charge trap layer. The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

When each of the nonvolatile memories 1211, 1212, 1213, and 1214 includes a NAND type flash memory, each of the nonvolatile memories 1211, 1212, 1213, and 1214 may include a memory cell array formed along a plurality of word lines and a plurality of bit lines. However, inventive concepts are not limited thereto and each of the nonvolatile memories 1211, 1212, 1213, and 1214 may include at least one of a PRAM (phase-change random access memory), a MRAM (magneto-resistive RAM), a ReRAM (resistive RAM), a FRAM (ferroelectric RAM), etc. A configuration of each of the nonvolatile memories 1211, 1212, 1213, and 1214 may be variously changed or modified. In some example embodiments, some or all of the nonvolatile memories 1211, 1212, 1213, and 1214 may be replaced with a volatile memory such as a SRAM (static RAM), a DRAM (dynamic RAM), a SDRAM (synchronous DRAM), etc.

The controller 1220 may include a RAID engine 1221, a first memory 1222, and a second memory 1223. The controller 1220 can control an overall operation of the storage device 1200. The controller 1220 may encode and decode signals/data processed in the storage device 1200.

The controller 1220 may include a hardware configuration, a software configuration, or a hybrid configuration thereof to perform those various operations and operations to be described later. For example, the controller 1220 may include a dedicated hardware circuit configured to perform a specific operation. The controller 1220 may include at least one processor core that can execute an instruction set of a program code configured to perform a specific operation.

The RAID engine 1221 may store data in the nonvolatile memories 1211, 1212, 1213, and 1214 in a RAID manner. The RAID may have various levels. The RAID may be one of a RAID level 0 (striped SET without parity or striping), a RAID level 1 (Mirrored SET without parity or Mirroring), a RAID level 2 (Hamming code parity), a RAID level 3 (striped SET with dedicated parity, bit interleaved parity, or byte level parity), a RAID level 4 (Block level parity), a RAID level 5 (Striped SET with distributed parity or interleave parity), a RAID level 6 (Striped SET with dual distributed parity), a RAID level 7, a RAID level 10, and a RAID level 53 or may be a RAID level (e.g., RAID 0+1, RAID 1+0, RAID 5+0, or RAID 0+1+5) obtained by merging at least two of the RAID levels described above. The RAID manner will be further described with reference to FIG. 3.

Each of the first memory 1222 and the second memory 1223 may store data used in operations of the controller 1220. To this end, each of the first memory 1222 and the second memory 1223 may include one or more of various nonvolatile/volatile memories. The first memory 1222 may operate at high speed to provide high performance of the controller 1220. For example, the first memory 1222 may include a SRAM. In some example embodiments, the electronic system 1000 may be implemented as single electronic device. The electronic system 1000 may be one of various electronic devices such as home appliances, a desktop computer, a laptop computer, a tablet computer, a smart phone, a wearable device, a video game console, etc. that include the host 1100 and the storage device 1200.

Figure 2:
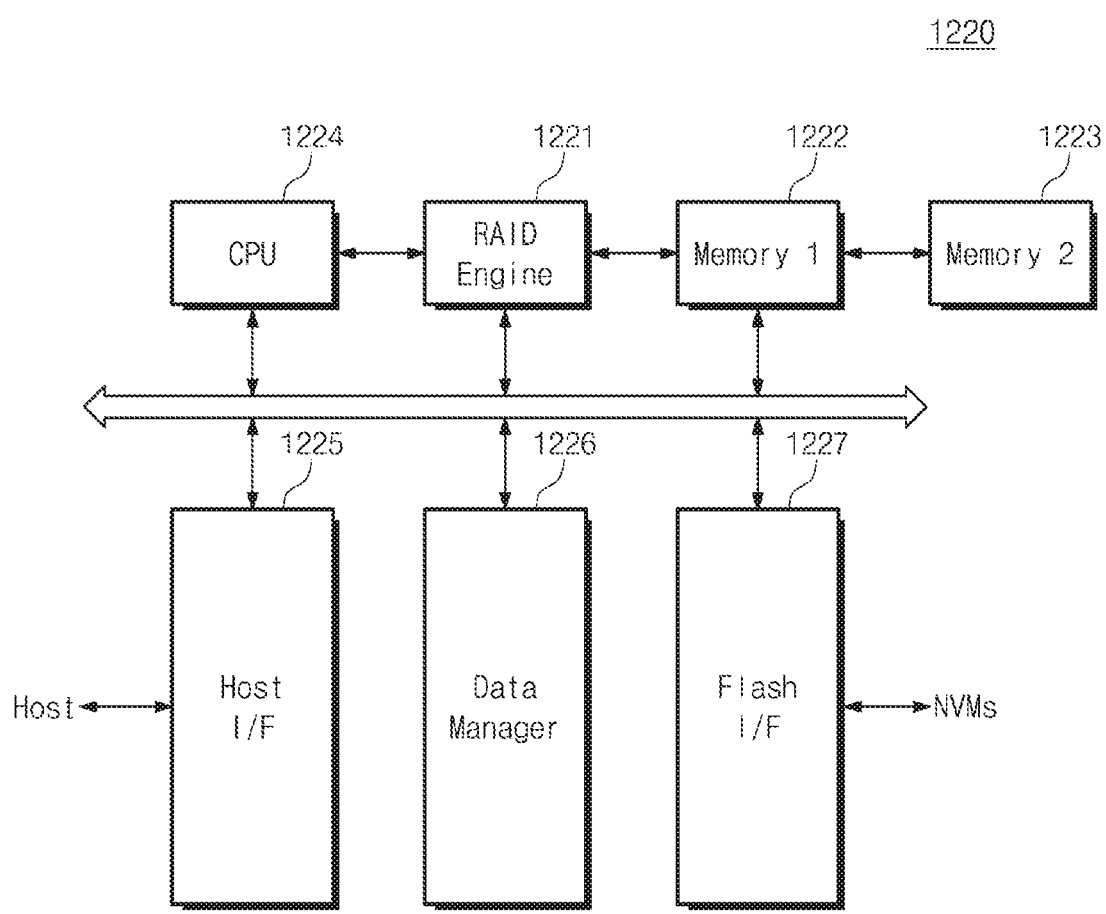
FIG. 2 is a block diagram illustrating a configuration of a controller in a storage device of FIG. 1.

FIG. 2 is a block diagram illustrating a configuration of a controller in a storage device of FIG. 1. The controller 1220 may include a RAID engine 1221, a first memory 1222, a second memory 1223, a central processing unit (CPU) 1224, a host interface 1225, a data manager 1226, and a flash interface 1227.

The RAID engine 1221 can process write-requested data in units of stripes to store it in the nonvolatile memories 1210 in a RAID manner. For example, the write-requested data may be managed as a stripe set unit. The stripe set may be divided into stripes which are stored in the nonvolatile memories 1210 respectively. The RAID engine 1221 may perform a parity operation based on the stripes.

The RAID engine 1221 may buffer intermediate results that occur while generating parities in the first memory 1222. When error occurs in a flow of data received by the controller 1220, the RAID engine 1221 may stop a parity operation. When a reception of data by the controller 1220 is delayed or other data is received to the controller 1220 in a state where data are not all received, the error may occur. When the error occurs in a hardware configuration or a software configuration of the controller 1220 and thereby a data flow is not controlled, the RAID engine 1221 may stop a parity operation. When a parity operation of the RAID engine 1221 is stopped, the intermediate results stored in the first memory 1222 may move to the second memory 1223.

When data is normally received by the controller 1220 or the error occurred in the controller 1220 is solved, the RAID engine 1221 may resume the parity operation. In order for the RAID engine 1221 to resume the parity operation, the intermediate results stored in the second memory 1223 may move to the first memory 1222. A stop operation and a resume operation of the parity operation will be described with reference to FIGS. 6 through 17C.

The CPU 1224 may transmit various control information used for a read/write operation on the nonvolatile memories 1210 to registers of the host interface 1225 and the flash interface 1227. The CPU 1224 may operate according to firmware provided for various control operations of the controller 1220. For example, the CPU 1224 may execute a garbage collection to manage the nonvolatile memories 1210 or a flash translation layer (FTL) to perform an address mapping, a wear leveling, etc.

When error occurs in a hardware configuration or a software configuration of the controller 1220, the CPU 1224 can control a parity operation of the RAID engine 1221 to stop. When error occurs in a flow of data received by the controller 1220, the CPU 1224 can control a parity operation of the RAID engine 1221 to stop. The CPU 1224 may control so that the intermediate results stored in the first memory 1222 move to the second memory 1223.

When data is normally received by the controller 1220 or error occurred in the controller 1220 is solved, the CPU 1224 can control so that a parity operation is resumed in the RAID engine 1221.

The host interface 1225 may perform a communication with the host 1100. For example, the host interface 1225 provides a communication channel on the host 1100. The host interface 1225 may provide a physical connection between the host 1100 and the storage device 1200. The host interface 1225 may provide an interface with the storage device 1200 in response to a bus format of the host 1100. The bus format of the host 1100 may correspond to one or more of a USB (universal serial bus), a SCSI (small computer system interface), a PCI express, an ATA, a PATA (parallel ATA), a SATA (serial ATA), a SAS (serial attached SCSI), and a UFS (universal flash storage).

The data manager 1226 may manage a flow of data (e.g., stripe set) received from the host 1100. The data manager 1226 may confirm meta or header information of each of a plurality of stripes constituting a stripe set. The data manager 1226 may confirm the order of received stripes based on the meta or header information. When a time taken for a stripe corresponding to the received stripe set to be received is delayed compared to a reference time or a stripe corresponding to other stripe set is received, the data manager 1226 may provide this information to at least one of the CPU 1224 and the RAID engine 1221.

The flash interface 1227 exchanges data (e.g., stripe set) with the nonvolatile memories 1210. The flash interface 1227 writes data in the nonvolatile memories 1210 through memory channels (not shown). Read data provided from the nonvolatile memories 1210 through the memory channels may be collected by the flash interface 1227.

Figure 3:
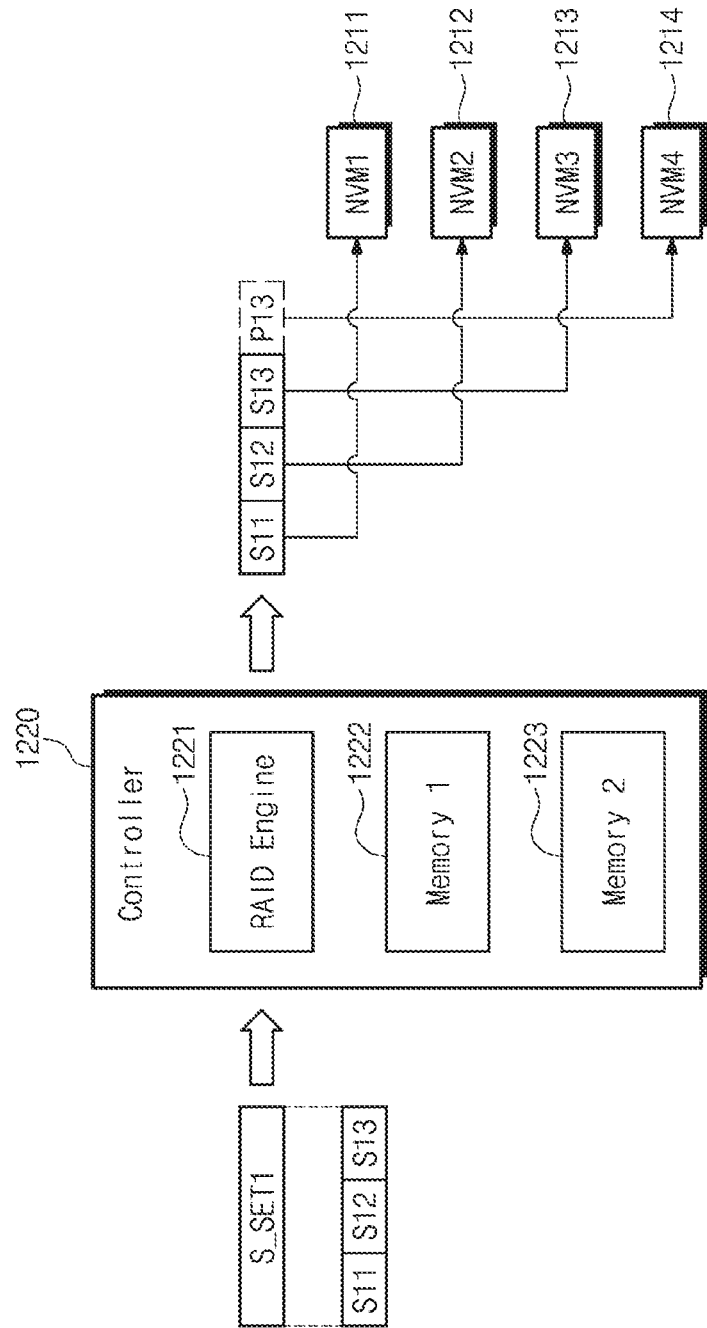
FIG. 3 is a block diagram illustrating a method of processing a stripe set using a RAID manner in a storage device of FIG. 1.

FIG. 3 is a block diagram illustrating a method of processing a stripe set using a RAID manner in a storage device of FIG. 1. In the RAID manner, data may be managed in units of stripes. The controller 1220 may receive a first stripe set S_SET1 from the host 1100. The first stripe set S_SET1 may correspond to one data. The first stripe set S_SET1 may be configured to a plurality of stripes. Each stripe may correspond to a data chunk. As an example, the first stripe set S_SET1 may be configured to include (and/or may be split into) first through third stripes S11, S12, and S13.

The RAID engine 1221 may receive the first stripe set S_SET1 including the stripes S11, S12, and S13 from the host 1100. The RAID engine 1221 may generate parity P13 based on the stripes S11, S12, and S13. When some of the stripes S11, S12, and S13 are lost or damaged, the parity P13 may be used to restore the lost or damaged stripe.

The RAID engine 1221 may perform various operations to generate the parity P13 based on the stripes S11, S12, and S13. The first memory 1222 and/or the second memory 1223 may store or buffer intermediate results generated/processed while the operations are performed. The RAID engine 1221 may buffer intermediate results generated during a generation of the parity P13 in the first memory 1222. When error occurs in an operation of the controller 1220, the RAID engine 1221 may move intermediate results stored in the first memory 1222 to the second memory 1223.

The stripes S11, S12, and S13 and the parity P13 may be distributively stored in the nonvolatile memories 1211, 1212, 1213, and 1214. As an example, the controller 1220 may store the stripes S11, S12, and S13 and the parity P13 in the nonvolatile memories 1211, 1212, 1213, and 1214 respectively.

When error occurs in at least one of the nonvolatile memories 1211, 1212, 1213, and 1214, a data chunk corresponding to a stripe included in the nonvolatile memory in which error occurs may be damaged. In this case, the controller 1220 can restore the data chunk corresponding to the damaged stripe based on the parity P13 and undamaged stripes among the stripes S11, S12, and S13. The RAID manner can improve reliability of the storage device 1200.

Figure 4:
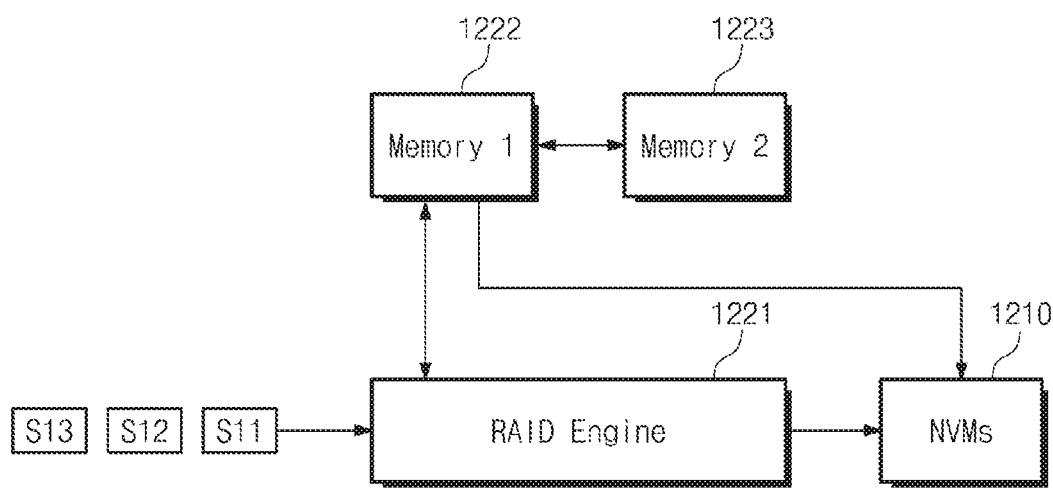
FIG. 4 is a block diagram illustrating a method of processing a stripe set using a RAID manner in a storage device.
Figure 5:
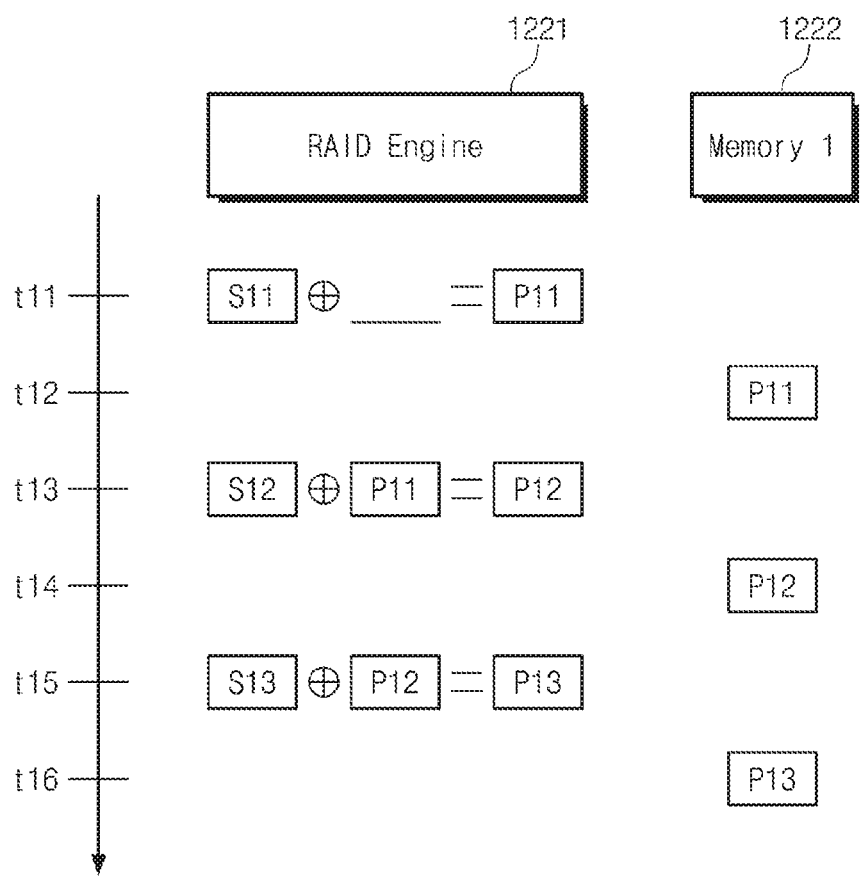
FIG. 5 is a conceptual diagram describing a process of generating parity in a storage device.

FIG. 4 is a block diagram illustrating a method of processing a stripe set using a RAID manner in a storage device. FIG. 5 is a conceptual diagram describing a process of generating parity in a storage device.

Referring to FIG. 4, the RAID engine 1221 may receive the stripes S11, S12, and S13. The RAID engine 1221 may receive the stripes S11, S12, and S13 in the order of the first stripe S11, the second stripe S12, and the third stripe S13 on the first stripe set S_SET1.

The RAID engine 1221 may perform a parity operation to generate the parity P13 based on the stripes S11, S12, and S13. The parity operation may include a bitwise exclusive logical OR operation. The RAID engine 1221 may include an operator to perform a parity operation.

The first memory 1222 may store an intermediate parity and/or a final parity calculated by the RAID engine 1221. The intermediate parity may mean intermediate results generated while the final parity is calculated and the final parity may mean parity stored in the nonvolatile memories 1210.

The second memory 1223 may store intermediate parity calculated by the RAID engine 1221. When error occurs in an operation of the controller 1220 while the RAID engine 1221 generates the final parity, the intermediate parity stored in the first memory 1222 may move to the second memory 1223.

Referring to FIGS. 4 and 5, at time t11, the RAID engine 1221 may receive the first stripe S11. The RAID engine 1221 may generate an intermediate parity P11 based on the first stripe S11. The intermediate parity P11 may be substantially the same as the first stripe S11. At time t12, the intermediate parity P11 may be stored in the first memory 1222 and the first stripe S11 may be stored in the nonvolatile memories 1210.

At time t13, the RAID engine 1221 may receive the second stripe S12. The RAID engine 1221 may also receive the intermediate parity P11 from the first memory 1222. The RAID engine 1221 may perform a parity operation on the second stripe S12 and the intermediate parity P11 to generate an intermediate parity P12. At time t14, the RAID engine 1221 may store the intermediate parity P12 in the first memory 1222. The RAID engine 1221 may store the second stripe S12 in the nonvolatile memories 1210.

At time t15, the RAID engine 1221 may receive the third stripe S13. The RAID engine 1221 may receive the intermediate parity P12 from the first memory 1222. The RAID engine 1221 may perform a parity operation on the third stripe S13 and the intermediate parity P12 to generate a final parity P13 (or parity P13). At time t16, the RAID engine 1221 may store the parity P13 in the first memory 1222. The RAID engine 1221 may store the third stripe S13 in the nonvolatile memories 1210. The first memory 1222 may store the parity P13 in the nonvolatile memories 1210.

Figure 6:
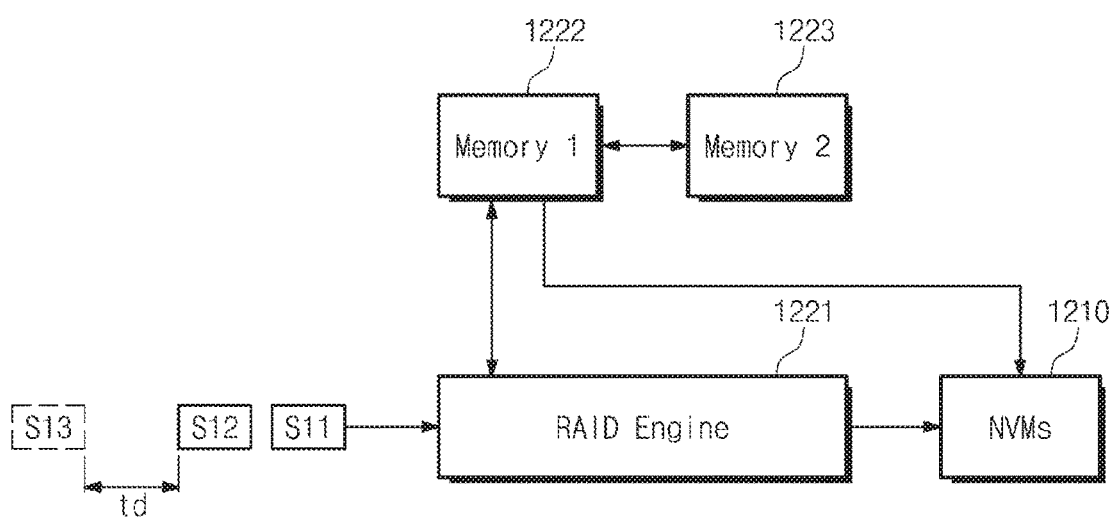
FIG. 6 is a block diagram illustrating a method of processing a stripe set using a RAID manner in a storage device of FIG. 1.
Figure 7:
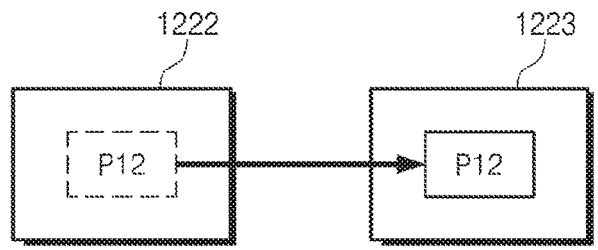
FIG. 7 is a block diagram illustrating intermediate parity that moves between a first memory and a second memory according to a method of processing a stripe set in a RAID engine of FIG. 6.

FIG. 6 is a block diagram illustrating a method of processing a stripe set using a RAID manner in a storage device of FIG. 1. FIG. 7 is a block diagram illustrating intermediate parity that moves between a first memory and a second memory according to a method of processing a stripe set in a RAID engine of FIG. 6.

Referring to FIG. 6, the RAID engine 1221 may receive the stripes S11, S12, and S13. The RAID engine 1221 may receive the stripes S11, S12, and S13 in the order of the first stripe S11, the second stripe S12, and the third stripe S13 on the first stripe set S_SET1.

A time delay td may occur between an input of the second stripe S12 and an input of the third stripe S13. As an output of the third stripe S13 of the host 1100 is delayed, the time delay td may occur. When error occurs in a hardware configuration or a software configuration of the controller 1220 after the first through third stripes S11, S12, and S13 are received by the controller 1220, the time delay td may occur.

When the time delay td becomes longer than a reference time, a parity operation of the RAID engine 1221 may be stopped. Referring to FIG. 7, the intermediate parity P12 stored in the first memory 1222 may move to the second memory 1223. The intermediate parity P12 generated on the second stripe S12 stored in the first memory 1222 may move to the second memory 1223. To perform a parity operation on other stripe set, the intermediate parity P12 of the first memory 1222 may be deleted.

Figure 8:
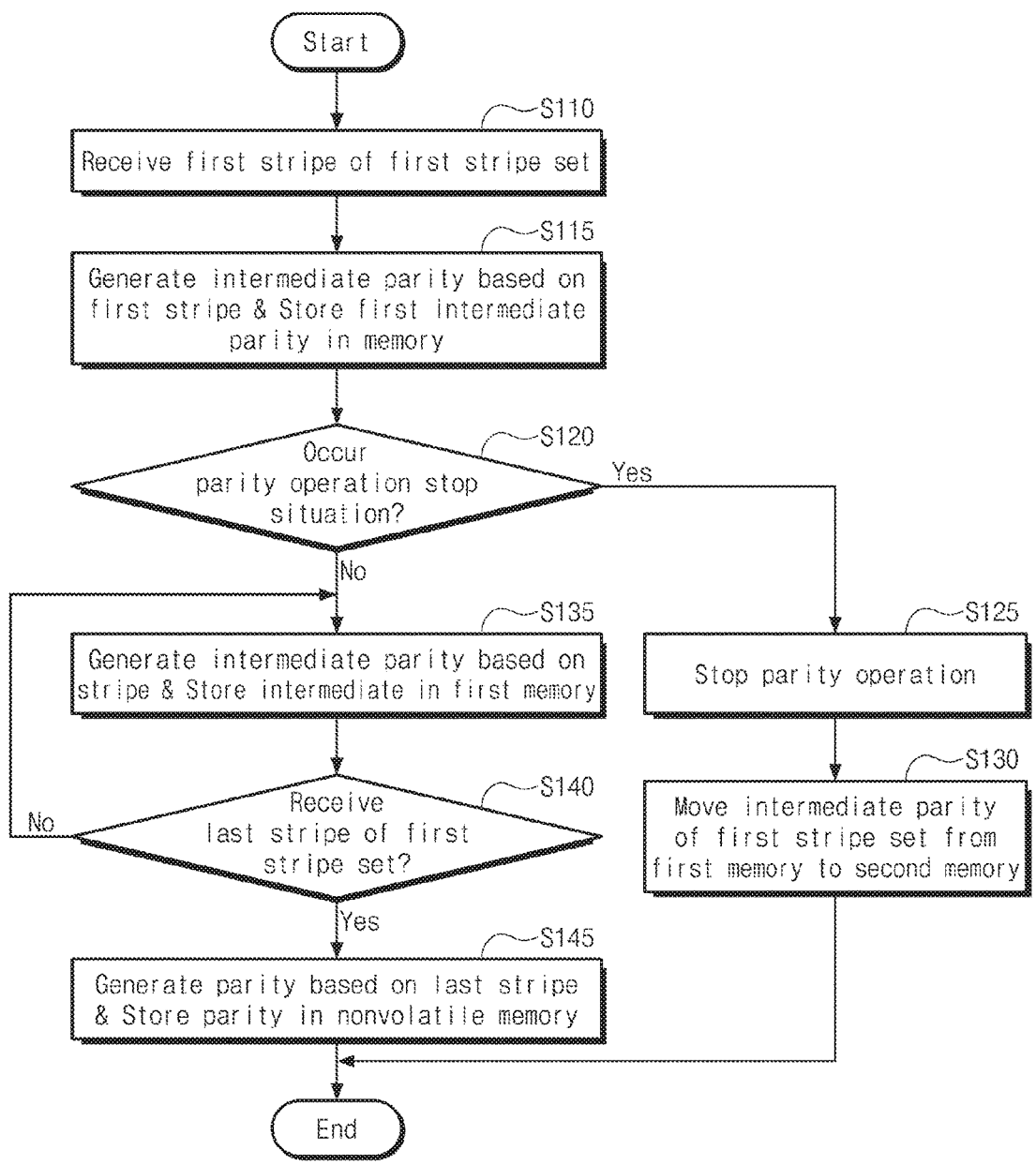
FIG. 8 is a flow chart describing a method of processing a stripe set using a RAID manner in a RAID engine of FIG. 6.

FIG. 8 is a flow chart describing a method of processing a stripe set using a RAID manner in a RAID engine of FIG. 6. Referring to FIGS. 6 through 8, in operation S110, the RAID engine 1221 may receive a stripe processed firstly in connection with the first stripe set S_SET1.

In operation S115, the RAID engine 1221 may generate intermediate parity based on the stripe and the generated intermediate parity may be stored in the first memory 1222. In operation S120, the RAID engine 1221 may determine whether a situation occurred where a parity operation has to be stopped. When error occurs in an operation of the controller 1220, a parity operation of the RAID engine 1221 may be stopped. When error occurs in an operation of the controller 1220, data corresponding to the stripe may not be processed. When a reception of the stripe by the controller 1220 is delayed, a parity operation of the RAID engine 1221 may be stopped.

When a situation where a parity operation has to be stopped occurs in the RAID engine 1221 (Yes), in operation S125, the RAID engine 1221 stops the parity operation. The parity operation is stopped and then, in operation S130, the intermediate parity stored in the first memory 1222 may move to the second memory 1223. The parity operation of the RAID engine 1221 may be finished.

When a situation where a parity operation has to be stopped does not occur in the RAID engine 1221 (No), in operation S135, the RAID engine 1221 may generate intermediate parity based on the received stripe and the intermediate parity stored in the first memory 1222. The RAID engine 1221 may store the generated intermediate parity in the first memory 1222.

In operation S140, the controller 1220 may determine whether a last stripe of the first stripe set S_SET1 is received. The RAID engine 1221 may receive information about the order of stripe from the data manager 1226 (refer to FIG. 2). When the received stripe is not the last stripe of the first stripe set S_SET1 (No), the RAID engine 1221 may generate intermediate parity based on the stripe received in the operation S135 and the intermediate parity stored in the first memory 1222.

When the received stripe is the last stripe of the first stripe set S_SET1 (Yes), in operation S145, the RAID engine 1221 may generate parity (e.g., final parity) based on the last stripe and the intermediate parity stored in the first memory 1222. The generated parity may be stored in the nonvolatile memories 1210.

Figure 9:
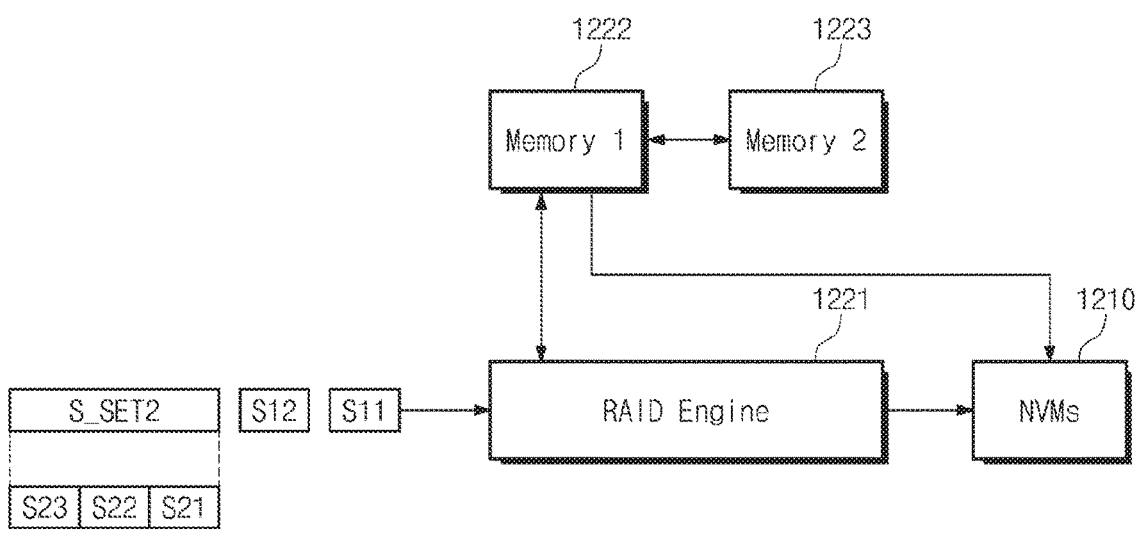
FIG. 9 is a block diagram illustrating a method of processing a stripe set using a RAID manner in a storage device of FIG. 1.
Figure 10:
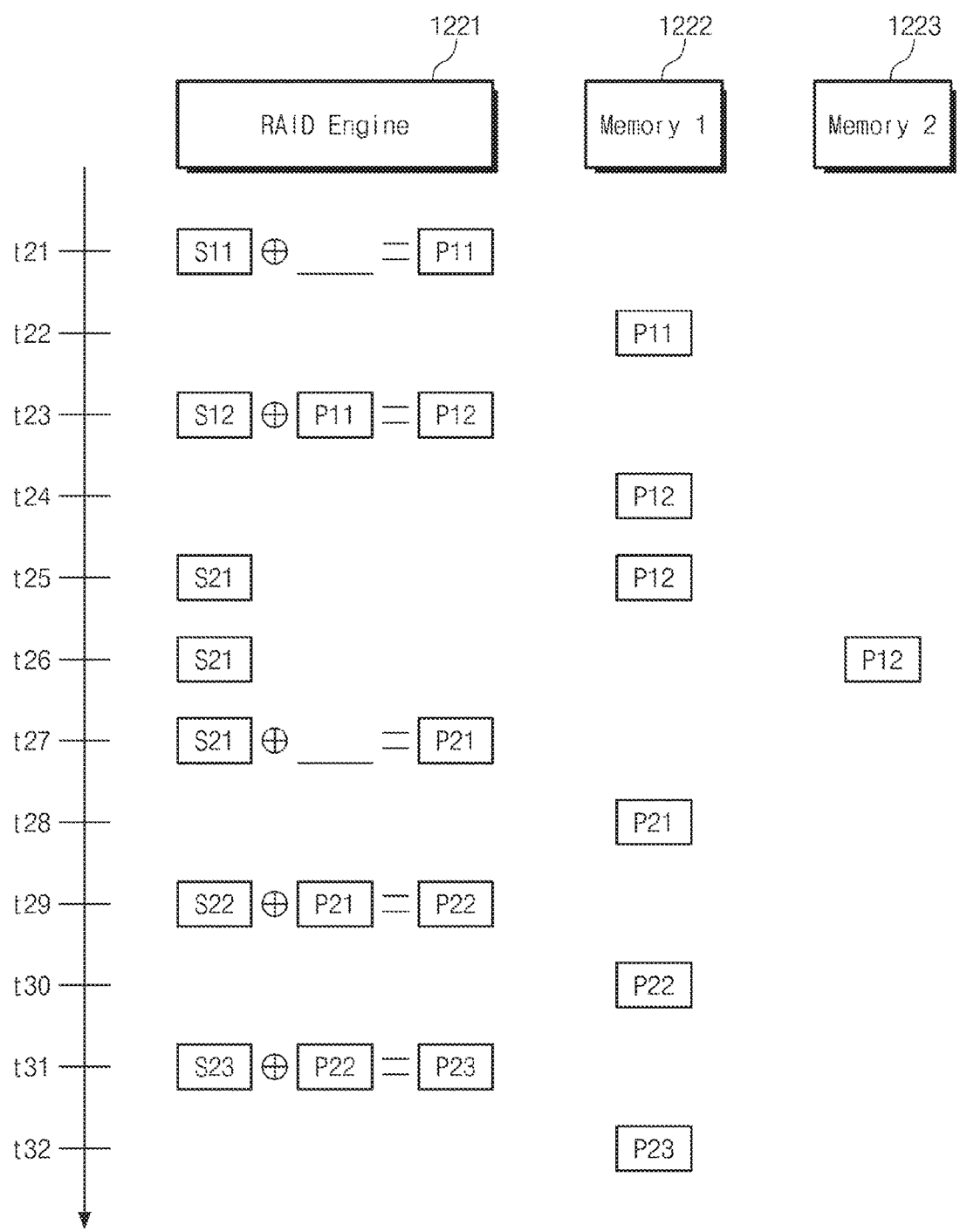
FIG. 10 is a conceptual diagram describing a process of generating parity in a RAID engine of FIG. 9.

FIG. 9 is a block diagram illustrating a method of processing a stripe set using a RAID manner in a storage device of FIG. 1. FIG. 10 is a conceptual diagram describing a process of generating parity in a RAID engine of FIG. 9.

Referring to FIG. 9, the RAID engine 1221 may not receive all of the strips S11, S12, S13 of the first stripe set S_SET1. For example, only some of the stripes S11, S12, and S13 of the first stripe set S_SET1 may be received by the RAID engine 1221. In a state where some stripes (e.g., S11, S12) of the first stripe set S_SET1 are received by the RAID engine 1221, stripes S21, S22, and S23 of a second stripe set S_SET2 may be received by the RAID engine 1221. Method of generating and storing parity of RAID engine 1221 will be described with reference to FIG. 10.

Referring to FIGS. 9 and 10, at time t21, the RAID engine 1221 may receive the first stripe S11. The RAID engine 1221 may generate an intermediate parity P11 based on the first stripe S11. The intermediate parity P11 may be substantially the same as the first stripe S11. At time t22, the intermediate parity P11 may be stored in the first memory 1222 and the first stripe S11 may be stored in the nonvolatile memories 1210.

At time t23, the RAID engine 1221 may receive the second stripe S12. The RAID engine 1221 may also receive the intermediate parity P11 from the first memory 1222. The RAID engine 1221 may perform a parity operation on the second stripe S12 and the intermediate parity P11 to generate an intermediate parity P12. At time t24, the RAID engine 1221 may store the intermediate parity P12 in the first memory 1222. The RAID engine 1221 may store the second stripe S12 in the nonvolatile memories 1210.

At time t25, the RAID engine 1221 may receive a first stripe S21 of the second stripe set S_SET2. In a state where the stripes of the first stripe set S_SET1 are not all received, the second stripe set S_SET2 is received. Because of this, a parity operation on the RAID engine 1221 may be stopped.

At time t26, the intermediate parity P12 may move from the first memory 1222 to the second memory 1223. The intermediate parity P12 stored in the first memory 1222 may be deleted such that a parity operation is performed on the stripes S21, S22, and S23 of the second stripe set S_SET2 in the RAID engine 1221.

At time t27, the RAID engine 1221 may generate intermediate parity P21 based on the first stripe S21. The intermediate parity P21 may be substantially the same as the first stripe S21. At time t28, the intermediate parity P21 may be stored in the first memory 1222 and the first stripe S21 may be stored in the nonvolatile memories 1210.

At time t29, the RAID engine 1221 may receive the second stripe S22. The RAID engine 1221 may also receive the intermediate parity P21 from the first memory 1222. The RAID engine 1221 may perform a parity operation on the second stripe S22 and the intermediate parity P21 to generate an intermediate parity P22. At time t30, the RAID engine 1221 may store the intermediate parity P22 in the first memory 1222. The RAID engine 1221 may store the second stripe S22 in the nonvolatile memories 1210.

At time t31, the RAID engine 1221 may receive the third stripe S23. The RAID engine 1221 may receive the intermediate parity P22 from the first memory 1222. The RAID engine 1221 may perform a parity operation on the third stripe S23 and the intermediate parity P22 to generate a final parity P23 (or parity P23). At time t32, the RAID engine 1221 may store the parity P23 in the first memory 1222. The RAID engine 1221 may store the third stripe S23 in the nonvolatile memories 1210. The first memory 1222 may store the parity P23 in the nonvolatile memories 1210.

In some example embodiments, when a data reception by the controller 1220 is delayed or error occurs in an internal operation of the controller 1220, the RAID engine 1221 may stop a parity operation on a received stripe set. The intermediate parity stored in the first memory 1222 may move to the second memory 1223. The intermediate parity stored in the first memory 1222 may be deleted and the RAID engine 1221 may be prepared to perform a parity operation on other stripe set. Thus, latency on a generation of the parity may be reduced and performance of the storage device 1200 may be improved.

Figure 11:
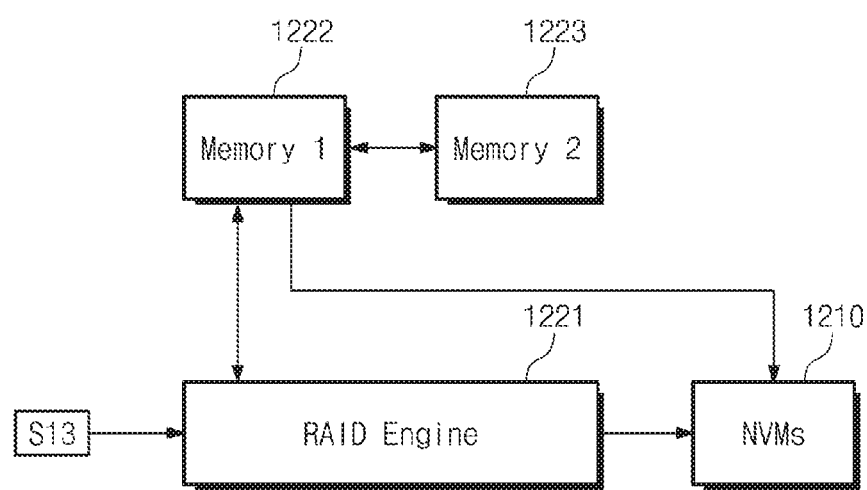
FIG. 11 is a block diagram illustrating a method of processing a stripe set using a RAID manner in a storage device of FIG. 1.
Figure 12:
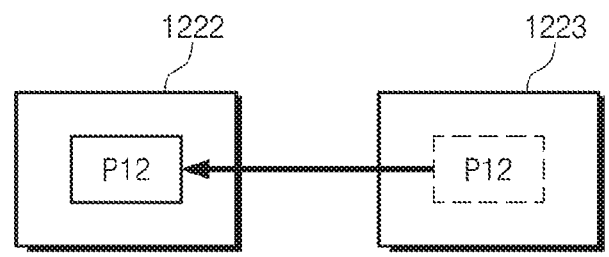
FIG. 12 is a block diagram illustrating intermediate parity that moves between a first memory and a second memory according to a method of processing a stripe set in a RAID engine of FIG. 11.
Figure 13:
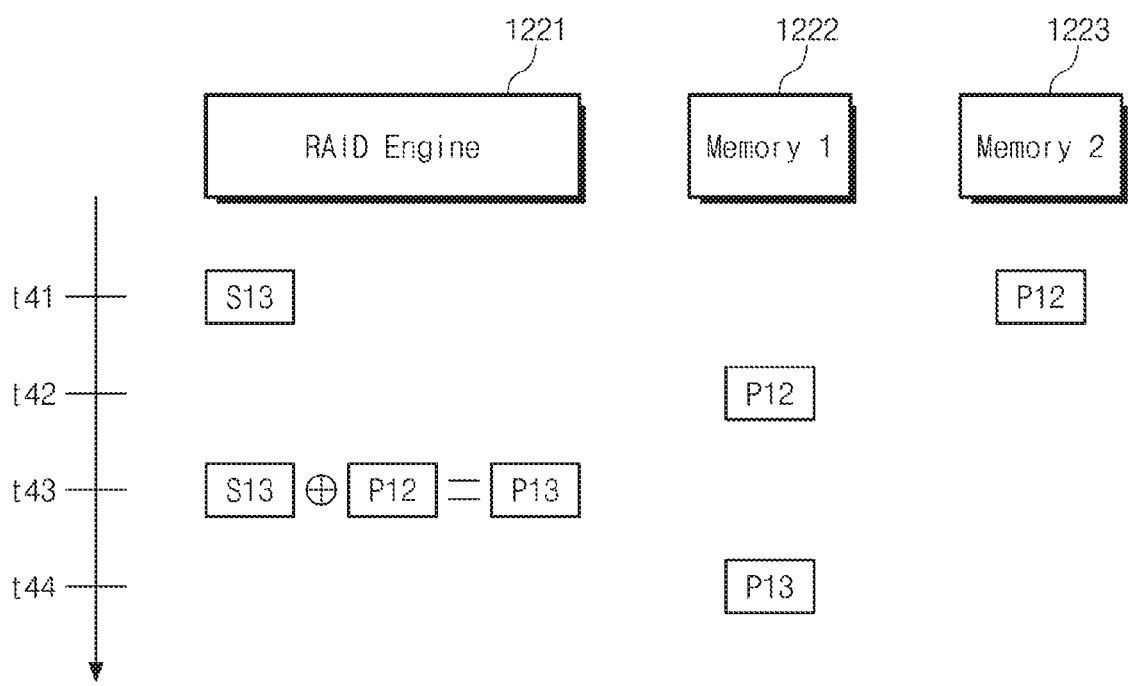
FIG. 13 is a conceptual diagram describing a process of generating parity in a RAID engine of FIG. 11.

FIG. 11 is a block diagram illustrating a method of processing a stripe set using a RAID manner in a storage device of FIG. 1. FIG. 12 is a block diagram illustrating intermediate parity that moves between a first memory and a second memory according to a method of processing a stripe set in a RAID engine of FIG. 11. FIG. 13 is a conceptual diagram describing a process of generating parity in a RAID engine of FIG. 11.

Referring to FIG. 11, in the case where data is normally received by the controller 1220 or error that occurred in the controller 1220 is solved, parity on the first stripe set S_SET1 may be received by the RAID engine 1221 again. Referring to FIG. 9, after a parity operation of the stripes S21, S22, and S23 of the second stripe set S_SET2 is completed, parity on the first stripe set S_SET1 may be received by the RAID engine 1221 again. The RAID engine 1221 may resume a parity operation on the first stripe set S_SET1. Meanwhile, the third stripe S13 is a stripe processed last on the first stripe set S_SET1, the RAID engine 1221 can perform a parity operation on the first stripe set S_SET1 only once.

Referring to FIG. 12, the RAID engine 1221 may resume a parity operation on the first stripe set S_SET1. To resume a parity operation, the intermediate parity P12 stored in the second memory 1223 may move to the first memory 1222. A process of generating parity of the RAID engine 1221 will be further described with reference to FIG. 13.

Referring to FIGS. 11 and 13, at time t41, the third stripe S13 may be received by the RAID engine 1221. At time t42, the intermediate parity P12 may move from the second memory 1223 to the first memory 1222.

At time t43, the RAID engine 1221 may perform a parity operation on the third stripe S13 and the intermediate parity P12. At time t44, the RAID engine 1221 may store the parity P13 in the first memory 1222. The RAID engine 1221 may store the third stripe S13 in the nonvolatile memories 1210. The first memory 1222 may store the parity P13 in the nonvolatile memories 1210.

Figure 14:
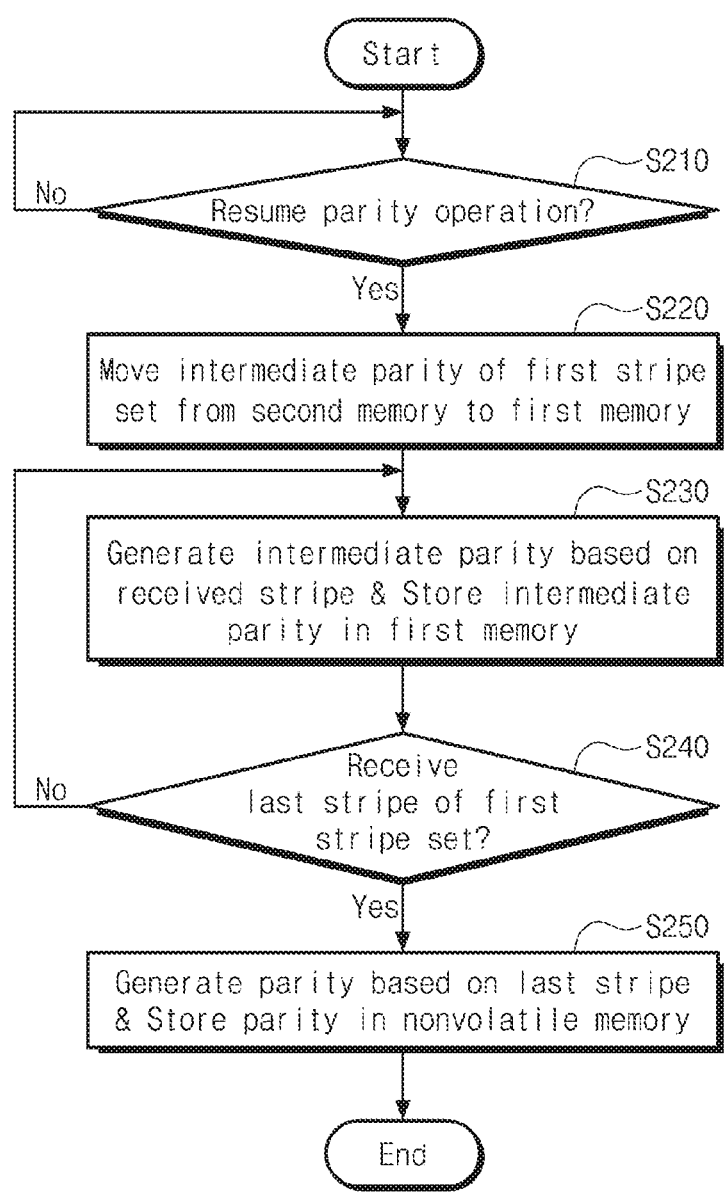
FIG. 14 is a flow chart describing a method of processing a stripe set using a RAID manner in a RAID engine of FIG. 11.

FIG. 14 is a flow chart describing a method of processing a stripe set using a RAID manner in a RAID engine of FIG. 11. In operation S210, the controller 1220 may determine whether a parity operation on the first stripe set S_SET1 may be resumed in the RAID engine 1221. When a parity operation on the first stripe set S_SET1 can be resumed (Yes), the RAID engine 1221 may receive a stripe of the first stripe set S_SET1. The received stripe may be a stripe which is not processed among the stripes of the first stripe set S_SET1.

In operation S220, intermediate parity stored in the second memory 1223 may move to the first memory 1222. As an example, the intermediate parity stored in the second memory 1223 is a result of a parity operation on the stripe received before the received stripe.

In operation S230, the RAID engine 1221 may generate intermediate parity based on the received stripe and the intermediate parity and the generated intermediate parity may be stored in the first memory 1222.

In an operation S240, the controller 1220 may determine whether the last stripe of the first stripe set S_SET1 is received. The RAID engine 1221 may receive information about the order of stripes from the data manager 1226 (refer to FIG. 2).

When the received stripe is not the last stripe of the first stripe set S_SET1 (No), the RAID engine 1221 may generate intermediate parity based on the received stripe and the intermediate parity stored in the first memory 1222. When the received stripe is the last stripe of the first stripe set S_SET1 (Yes), in operation S250, the RAID engine 1221 may generate parity (or final parity) based on the last stripe and the intermediate parity stored in the first memory 1222. The generated parity may be stored in the nonvolatile memories 1210.

Figure 15:
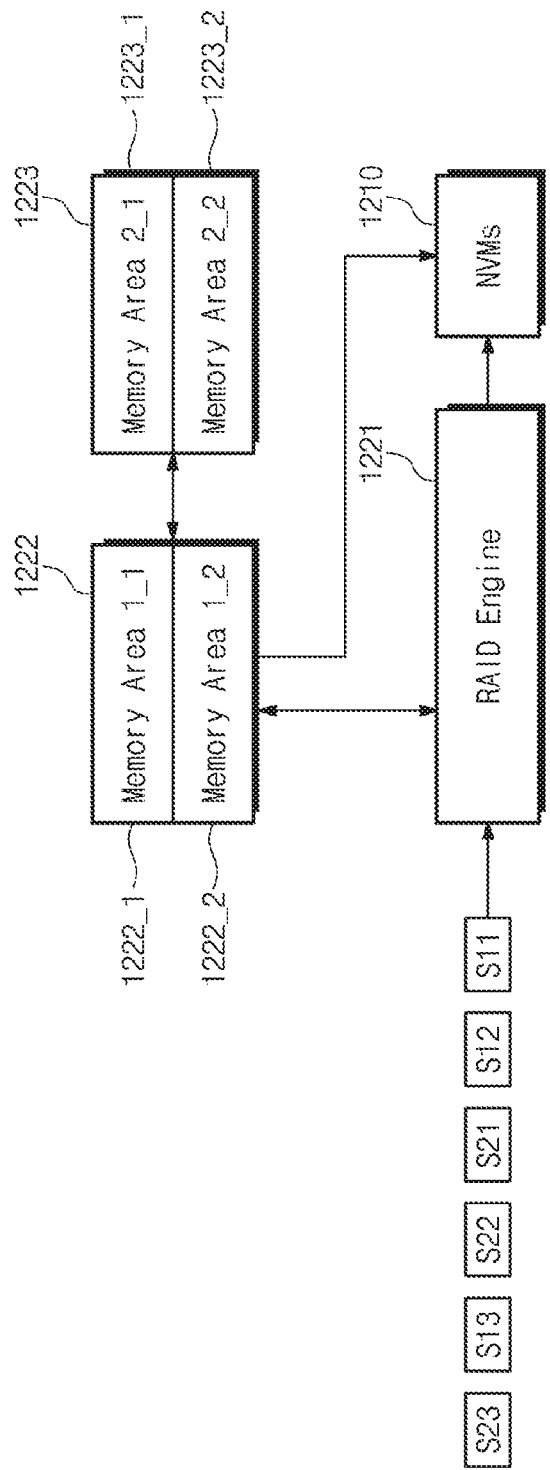
FIG. 15 is a block diagram illustrating a method of processing a stripe set using a RAID manner in a storage device of FIG. 1.

FIG. 15 is a block diagram illustrating a method of processing a stripe set using a RAID manner in a storage device of FIG. 1. Referring to FIG. 15, the stripes S11, S12, and S13 of the first stripe set S_SET1 and the stripe S21, S22 and S23 of the second stripe set S_SET2 may be non-sequentially input to the RAID engine 1221.

The stripes may be input to the RAID engine 1221 in the order of the first stripe S11 and the second stripe S12 of the first stripe set S_SET1, the first stripe S21 and the second stripe S22 of the second stripe set S_SET2, the third stripe S13 of the first stripe set S_SET1, and the third stripe S23 of the second stripe set S_SET2. When the stripes are non-sequentially input to the RAID engine 1221, a process of generating parity is described with reference to FIG. 16.

The first memory 1222 may be divided into a plurality of memory areas 1222_1, and 1222_2. Each of the memory areas 1222_1, and 1222_2 may store intermediate parity on the first stripe set S_SET1 and intermediate parity on the second stripe set S_SET2. The second memory 1223 may be divided into a plurality of memory areas 1223_1, and 1223_2. Each of the memory areas 1223_1, 1223_2 may store intermediate parity received from the memory areas 1222_1, and 1222_2 of the first memory 1222. Although each of the first and second memories 1222 and 1223 shows two memory areas, inventive concepts are not limited thereto and the number of memory areas may be variously changed or modified.

Figure 16:
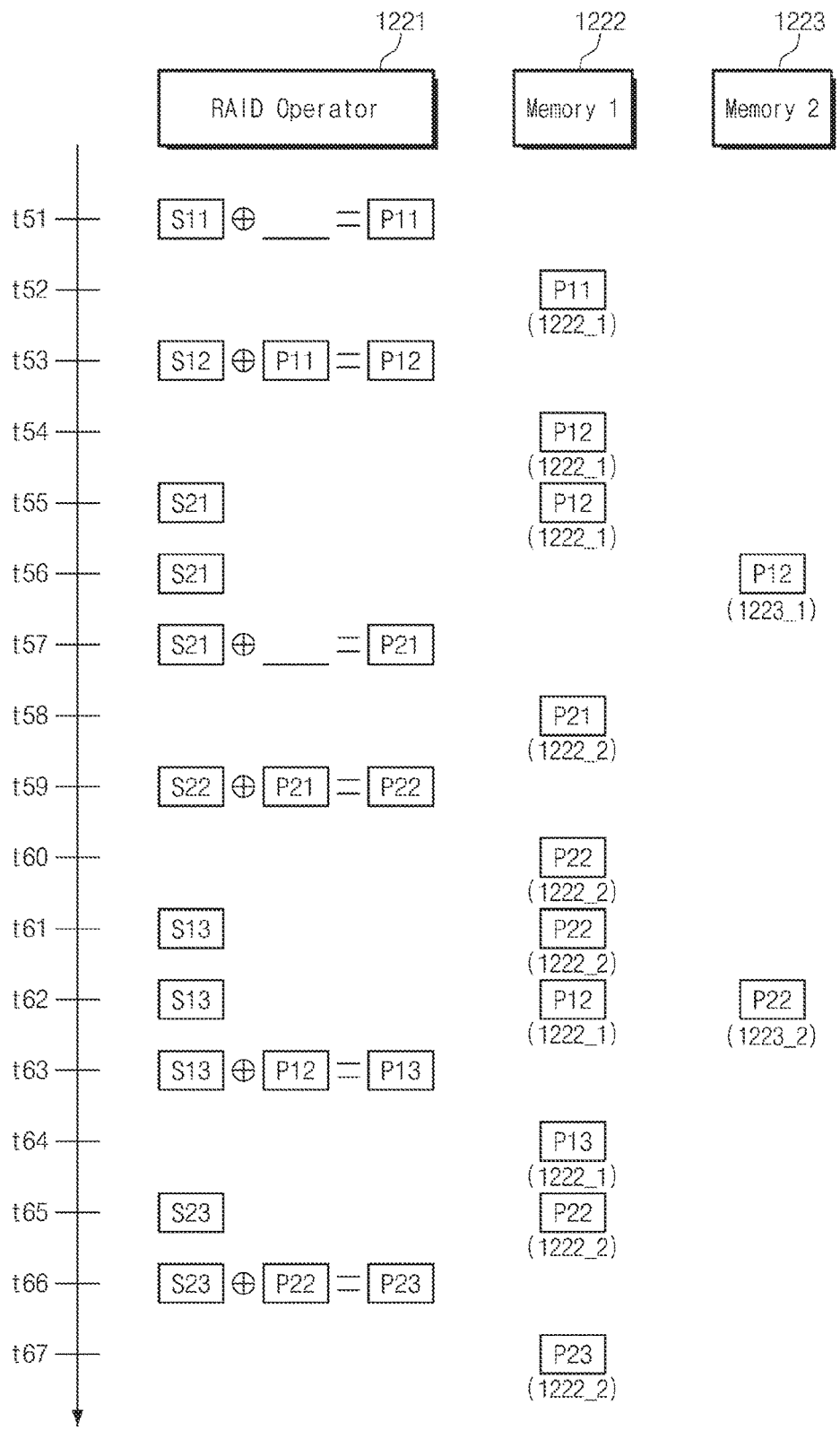
FIG. 16 is a conceptual diagram describing a process of generating parity in a RAID engine of FIG. 15.
Figure 17A:
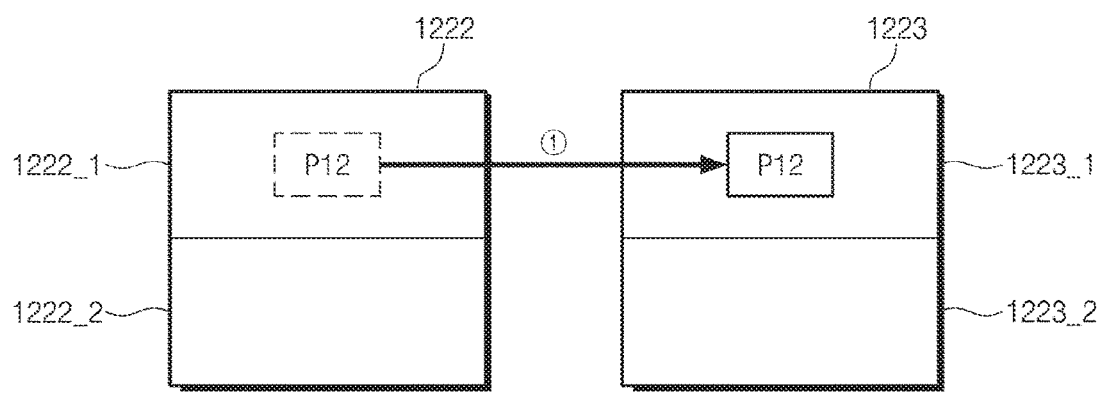
FIGS. 17A to 17C are block diagrams illustrating intermediate parity that moves between a first memory and a second memory according to a method of processing a stripe set in a RAID engine of FIG. 15.
Figure 17B:
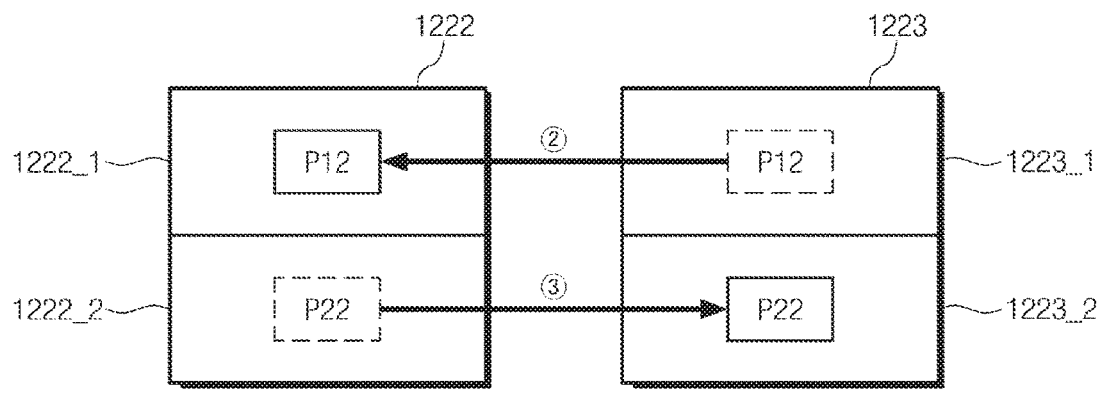
Figure 17C:
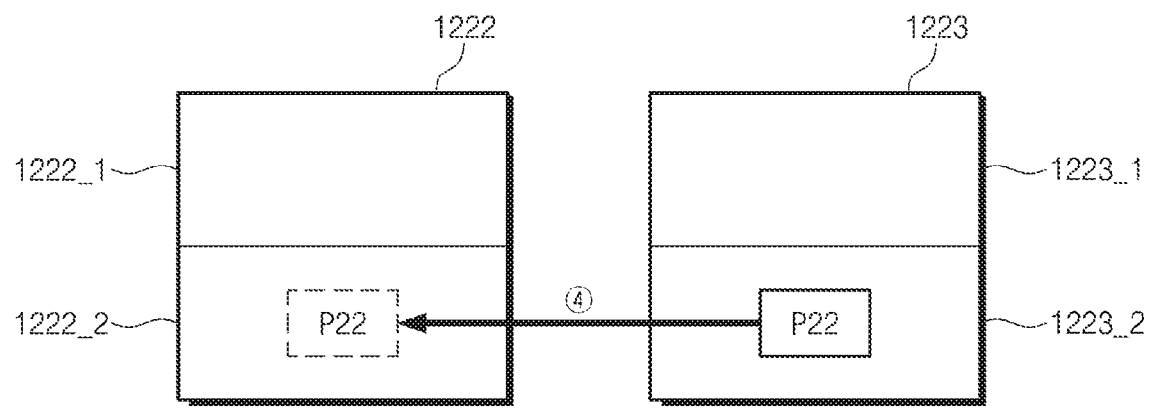

FIG. 16 is a conceptual diagram describing a process of generating parity in a RAID engine of FIG. 15. FIGS. 17A to 17C are block diagrams illustrating intermediate parity that moves between a first memory and a second memory according to a method of processing a stripe set in a RAID engine of FIG. 15.

Referring to FIGS. 15 and 16, at time t51, the RAID engine 1221 may receive the first stripe S11 of the first stripe set S_SET1. The RAID engine 1221 may generate the intermediate parity P11 based on the first stripe S11. The intermediate parity P11 may be substantially the same as the first stripe S11. At time t52, the intermediate parity P11 may be stored in the first memory area 1222_1 of the first memory 1222 and the first stripe S11 may be stored in the nonvolatile memories 1210.

At time t53, the RAID engine 1221 may receive the second stripe S12 of the first stripe set S_SET1. The RAID engine 1221 may receive the intermediate parity P11 from the first memory area 1222_1 of the first memory 1222. The RAID engine 1221 may perform a parity operation on the second stripe S12 and the intermediate parity P11 to generate intermediate parity P12. At time t54, the RAID engine 1221 may store the intermediate parity P12 in the first memory area 1222_1 of the first memory 1222. The RAID engine 1221 may store the second stripe S12 in the nonvolatile memories 1210.

At time t55, the RAID engine 1221 may receive the first stripe S21 of the second stripe set S_SET2. The second stripe set S_SET2 is received in a state where the stripes of the first stripe set S_SET1 are not all received. Because of this, a parity operation on the first stripe set S_SET1 may be stopped.

Referring to FIG. 16 together with FIG. 17A, at time t56, the intermediate parity P12 stored in the first memory area 1222_1 of the first memory 1222 may move to the first memory area 1223_1 of the second memory 1223 (①). To perform a parity operation on the stripes S21, S22, and S23 of the second stripe set S_SET2 in the RAID engine 1221, the intermediate parity P12 stored in the first memory 1222 may be deleted.

At time t57, the RAID engine 1221 may generate intermediate parity P21 based on the first stripe S21 of the second stripe set S_SET2. The intermediate parity P21 may be substantially the same as the first stripe S21. At time t58, the intermediate parity P21 may be stored in the second memory area 1222_2 of the first memory 1222 and the first stripe S21 may be stored in the nonvolatile memories 1210.

At time t59, the RAID engine 1221 may receive the second stripe S22 of the second stripe set S_SET2. The RAID engine 1221 may receive the intermediate parity P21 from the second memory area 1222_2 of the first memory 1222. The RAID engine 1221 may perform a parity operation on the second stripe S22 and the intermediate parity P21 to generate intermediate parity P22. At time t60, the RAID engine 1221 may store the intermediate parity P22 in the second memory area 1222_2 of the first memory 1222. The RAID engine 1221 may store the second stripe S22 in the nonvolatile memories 1210.

At time t61, the RAID engine 1221 may receive the third stripe S13 of the first stripe set S_SET1. The RAID engine 1221 may resume a parity operation on the first stripe set S_SET1. The RAID engine 1221 may stop a parity operation on the second stripe set S_SET2 to perform a parity operation on the third stripe S13 of the first stripe set S_SET1.

Referring to FIG. 16 together with FIG. 17B, at time t62, the intermediate parity P12 on the first stripe set S_SET1 stored in the first memory area 1223_1 of the second memory 1223 may move to the first memory area 1222_1 of the first memory 1222 (②). The intermediate parity P22 on the second stripe set S_SET2 stored in the second memory area 1222_2 of the first memory 1222 may move to the second memory area 1223_2 of the second memory 1223 (③). A movement of the intermediate parities between the first memory 1222 and the second memory 1223 may be performed at the same time.

At time t63, the RAID engine 1221 may receive the intermediate parity P12 from the memory area 1222_1 of the first memory 1222. The RAID engine 1221 may perform a parity operation on the third stripe S13 and the intermediate parity P12 to generate a final parity P13 (or parity P13). At time t64, the RAID engine 1221 may store the parity P13 in the first memory area 1222_1 of the first memory 1222. The RAID engine 1221 may store the third stripe S13 in the nonvolatile memories 1210. The first memory 1222 may store the parity P13 in the nonvolatile memories 1210.

At time t65, the RAID engine 1221 may receive the third stripe S23 of the second stripe set S_SET2. The RAID engine 1221 may resume a parity operation on the second stripe set S_SET2. Referring to FIG. 16 together with FIG. 17C, to resume a parity operation on the second stripe set S_SET2, the intermediate parity P22 stored in the second memory area 1223_2 of the second memory 1223 may move to the second memory area 1222_2 of the first memory 1222 (④).

At time t66, the RAID engine 1221 may receive the intermediate parity P22 from the second memory area 1222_2 of the first memory 1222. The RAID engine 1221 may perform a parity operation on the third stripe S23 and the intermediate parity P22 to generate a final parity P23 (or parity P23). At time t67, the RAID engine 1221 may store the parity P23 in the second memory area 1222_2 of the first memory 1222. The RAID engine 1221 may store the third stripe S23 in the nonvolatile memories 1210. The first memory 1222 may store the parity P23 in the nonvolatile memories 1210.

When a reception of stripe by the controller 1220 is delayed or a flow of stripe is not controlled by error that occurred inside the controller 1220, the RAID engine 1221 may stop a parity operation on the received stripe set. The RAID engine 1221 may move intermediate parity generated during a parity operation in the first memory 1222 to the second memory 1223. The RAID engine 1221 may be prepared to delete intermediate parity stored in the first memory 1222 and to perform a parity operation on other stripe set. When data is normally received by the controller 1220 or error that occurred in the controller 1220 is solved, the RAID engine 1221 may resume a parity operation. Thus, latency on a generation of the parity may be reduced and performance of the storage device 1200 may be improved.

According to some example embodiments of inventive concepts, when a parity operation on data is stopped, a storage device may move intermediate parity stored in a memory to other memory and may perform a parity operation on other data. Thus, latency on a generation of the parity may be reduced and performance of the storage device may be improved.

While some example embodiments have been particularly shown and described, it will be understood by one of ordinary skill in the art that variations in form and detail may be made therein without departing from the spirit and scope of the claims.

What is claimed is:

1. A storage device comprising:
a plurality of nonvolatile memories configured to distributively store first and second stripes of a stripe set; and
a controller including a first memory and a second memory,
the controller being configured to receive the first and second stripes from a host,
the controller being configured to distributively store the first and second stripes in the plurality of nonvolatile memories,
the controller being configured to perform a parity operation based on the first and second stripes,
the controller being configured to generate intermediate parity based on the first stripe, store the intermediate parity in the first memory, and move the intermediate parity stored in the first memory to the second memory if the parity operation is stopped.

2. The storage device of claim 1, wherein the controller includes a RAID engine for performing the parity operation.

3. The storage device of claim 2, wherein
the controller is configured to stop the parity operation and move the intermediate parity from the first memory to the second memory if an error occurs while the RAID engine performs the parity operation based on the first and second stripes.

4. The storage device of claim 2, wherein if the controller does not receive the second stripe within a reference time after the controller receives first stripe, the controller is configured to stops the parity operation using the RAID engine and to move the intermediate parity stored in the first memory moves to the second memory.

5. The storage device of claim 4, wherein
the stripe set is a first stripe set, and
the controller is configured to perform the parity operation using the RAID engine on third and fourth stripes of a second stripe set that is different from the first stripe set if the controller receives the second stripe set from the host.

6. The storage device of claim 5, wherein
the controller is configured to generate first intermediate parity based on the third stripe using the RAID engine,
the controller is configured to store the first intermediate parity in the first memory,
the controller is configured to receive the fourth stripe receive after the third stripe from the host, and
the controller is configured to generate parity on the second stripe set based on the fourth stripe and the first intermediate parity stored in the first memory and store the generated parity on the second stripe set in the first memory, if the fourth strip is a last stripe of the second stripe set.

7. The storage device of claim 6, wherein
the first memory is further to output the parity on the second stripe set to the nonvolatile memories, and
the nonvolatile memories are configured to distributively store the third and fourth stripes and the parity on the second stripe set.

8. The storage device of claim 1, wherein the controller is configured to move the intermediate parity stored in the second memory to the first memory if the parity operation is resumed.

9. The storage device of claim 8, wherein if the second stripe is a last stripe of the stripe set, the controller is configured to generate parity on the stripe set based on the second stripe and the intermediate parity stored in the first memory using a RAID engine and store the generated parity on the stripe set in the first memory.

10. The storage device of claim 9, wherein the first memory is configured to output the parity on the stripe set to the nonvolatile memories.

11. A storage device comprising:
a plurality of nonvolatile memories configured to distributively store first and second stripes of a first stripe set and a third stripe of a second stripe set; and
a controller including a first memory and a second memory,
the controller being configured to receive the first and second stripes and the third stripe from a host and to distributively store the first and second stripes and the third stripe in the nonvolatile memories,
the controller being configured to generate first intermediate parity based on the first stripe, store the first intermediate parity in the first memory and if the controller receives the third stripe from the host after the first stripe instead of the second stripe, the controller is configured to move the first intermediate parity stored in the first memory to the second memory, to generate second intermediate parity based on the third stripe, and to store the second intermediate parity in the first memory.

12. The storage device of claim 11, wherein
the controller further includes a RAID engine configured to generate the first intermediate parity based on the first stripe, to store the first intermediate parity in the first memory, to generate the second intermediate parity based on the third stripe, and to store the second intermediate parity in the first memory.

13. The storage device of claim 12, wherein if the controller receives the second stripe after the third stripe instead of a fourth stripe of the second stripe set, the controller is configured to move the second intermediate parity stored in the first memory to the second memory, and to move the first intermediate parity stored in the second memory to the first memory.

14. The storage device of claim 13, wherein if the second stripe is the last stripe of the first stripe set, the RAID engine is configured to generate parity based on the second stripe and the first intermediate parity stored in the first memory and to store the generated parity in the first memory.

15. The storage device of claim 14, wherein
the generated parity is first parity,
the first memory is configured to output the first parity to the nonvolatile memories,
the controller is configured to move the second intermediate parity stored in the second memory to the first memory if the controller receives the fourth strip, and
if the fourth stripe is a last stripe of the second stripe set, the controller is configured to generate second parity based on the fourth stripe and the second intermediate parity stored in the first memory using the RAID engine and to store the second parity in the first memory.

16. A storage device comprising:
a plurality of nonvolatile memories configured to distributively store a plurality of stripes of at least one stripe set, the at least one stripe set including a first stripe set; and
a controller connected to the plurality of nonvolatile memories,
the controller being configured to receive the plurality of stripes of the at least one stripe set from a host,
the controller including a first memory and a second memory,
the controller being configured to perform a parity operation on the plurality of stripes of the at least one stripe set, the parity operation including using the first memory to buffer an intermediate parity result while the controller generates a final parity of the first stripe set based on the plurality of stripes of the first stripe set and distributes the plurality of stripes to the plurality of nonvolatile memories,
the controller being configured to stop the parity operation and to transfer the intermediate parity result to the second memory if an error occurs in a flow of the plurality of stripes of the first stripe set from the host to the controller during the parity operation, and
the controller being configured to resume the parity operation, if the error in the plurality of stripes of the first stripe set is solved, by transferring the intermediate parity result to the first memory and performing the parity operation to generate the final parity of the first stripe set based on a remaining portion of the plurality of stripes of the first stripe set and the intermediate parity.

17. The storage device of claim 16, wherein
the controller includes a RAID engine, and
the controller is configured to perform the parity operation on the plurality of stripes of the first stripe set using the RAID engine.

18. The storage device of claim 16, wherein
at least one strip set includes a second stripe set,
the controller is configured to stop the parity operation on the first stripe set, generate the intermediate parity result based on a most-recent one of the plurality of stripes of the first stripe set that the controller received during the parity operation on the first stripe set, and begin the parity operation on the second stripe set, if the controller receives one of the plurality of stripes of the second stripe set after the controller receives at least one of the plurality of stripes of the first stripe set and before the controller receives a final one of the plurality of stripes of the first stripe set, and
the controller is configured to resume the parity operation on the first stripe set if the controller receives a one stripe among the remaining portion of the plurality of stripes of the first stripe set.

19. The storage device of claim 18, wherein
the first memory includes a plurality of first memory areas,
the second memory includes a plurality of second memory areas,
the controller is configured to transfer the intermediate parity result of the parity operation on the first stripe set to a first one of the plurality of second memory areas if the controller stops the parity operation on the first stripe set, and
the controller is configured to transfer an intermediate parity result of the parity operation on the second stripe set to a second one of the plurality of second memory areas if the controller stop the parity operation on the second stripe set.

20. The storage device of claim 16, wherein each of the nonvolatile memories is a NAND type flash memory.

* * * * *

UNITED STATES PATENT AND TRADEMARK OFFICE
CERTIFICATE OF CORRECTION

Page 1 of 1

PATENT NO. : 10,521,152 B2
APPLICATION NO. : 15/711129
DATED : December 31, 2019
INVENTOR(S) : Dongjin Park et al.

It is certified that error appears in the above-identified patent and that said Letters Patent is hereby corrected as shown below:

On the Title Page

Add Item (30):
(30) Foreign Application Priority Data
Nov. 7, 2016 (KR) .......................... 10-2016-0147673

Signed and Sealed this
Twenty-fourth Day of March, 2020

Andrei Iancu
*Director of the United States Patent and Trademark Office*